United States Patent [19]

Bouyoucos et al.

[11] Patent Number: 4,663,206
[45] Date of Patent: May 5, 1987

[54] STRESS RELIEF AND EDGE SEALING OF WELDED JOINTS IN PLASTICS PARTS

[75] Inventors: John V. Bouyoucos, Pittsford; David W. Durfee, Rochester, both of N.Y.

[73] Assignee: Hydroacoustics Inc., Rochester, N.Y.

[21] Appl. No.: 609,361

[22] Filed: May 11, 1984

[51] Int. Cl.⁴ .......................... B32B 3/00; B29C 37/04
[52] U.S. Cl. ........................................ 428/57; 156/69; 156/73.5; 156/267; 156/304.6; 156/580; 264/23; 264/68; 264/161; 264/163; 264/248
[58] Field of Search ............. 156/69, 73.5, 267, 304.6, 156/580; 264/248, 161, 163, 68, 23; 428/57

[56] References Cited

U.S. PATENT DOCUMENTS

| | | | |
|---|---|---|---|
| 2,933,428 | 4/1960 | Mueller | 156/73.5 |
| 3,234,064 | 2/1966 | Smith | 156/267 |
| 3,243,487 | 3/1966 | Smith | 156/267 |
| 3,346,435 | 10/1967 | Beck | 156/69 |
| 3,388,021 | 6/1968 | Johnson | 156/69 |
| 3,466,214 | 9/1969 | Polk et al. | 156/267 |
| 3,864,892 | 2/1975 | Molvar | 156/69 |
| 4,086,122 | 4/1978 | Bouyoucos et al. | 156/580 |
| 4,328,067 | 5/1982 | Cesano | 156/267 |
| 4,337,024 | 6/1982 | Turner et al. | 425/363 |
| 4,390,384 | 6/1983 | Turner | 156/221 |

Primary Examiner—Jan Silbaugh
Assistant Examiner—Hubert C. Lorin
Attorney, Agent, or Firm—Martin LuKacher

[57] ABSTRACT

In order to stress relieve exposed portions of plastic welds, and thereby reduce susceptability of such welds to solvent-induced crazing and cracking, the welded parts are formed with flanges extending outwardly therefrom. These flanges are at least partially joined during welding, their adjoining surfaces providing at least a portion of the welded joint. After welding, the flanges are compressed in a direction transverse to their adjoining welded surfaces, the compression being of sufficient magnitude to exceed the yield strength of the flanges, thereby relieving stresses in the exposed portion of the welds. The flanges may be sheared, as by a blade which provides both transverse compressive forces and compressive forces in the direction of the adjoining welded surfaces. The flanges may be sheared through, so as to enable the sheared off end to be removed, or the shearing may penetrate only through the weld zone, providing a notch, but leaving the flanges in place. The compressed and/or sheared flanges provide an exposed portion of the welds in which tensile stresses are relieved, reducing susceptability to solvent-induced crazing or cracking, and thereby edge sealing the welds.

15 Claims, 7 Drawing Figures

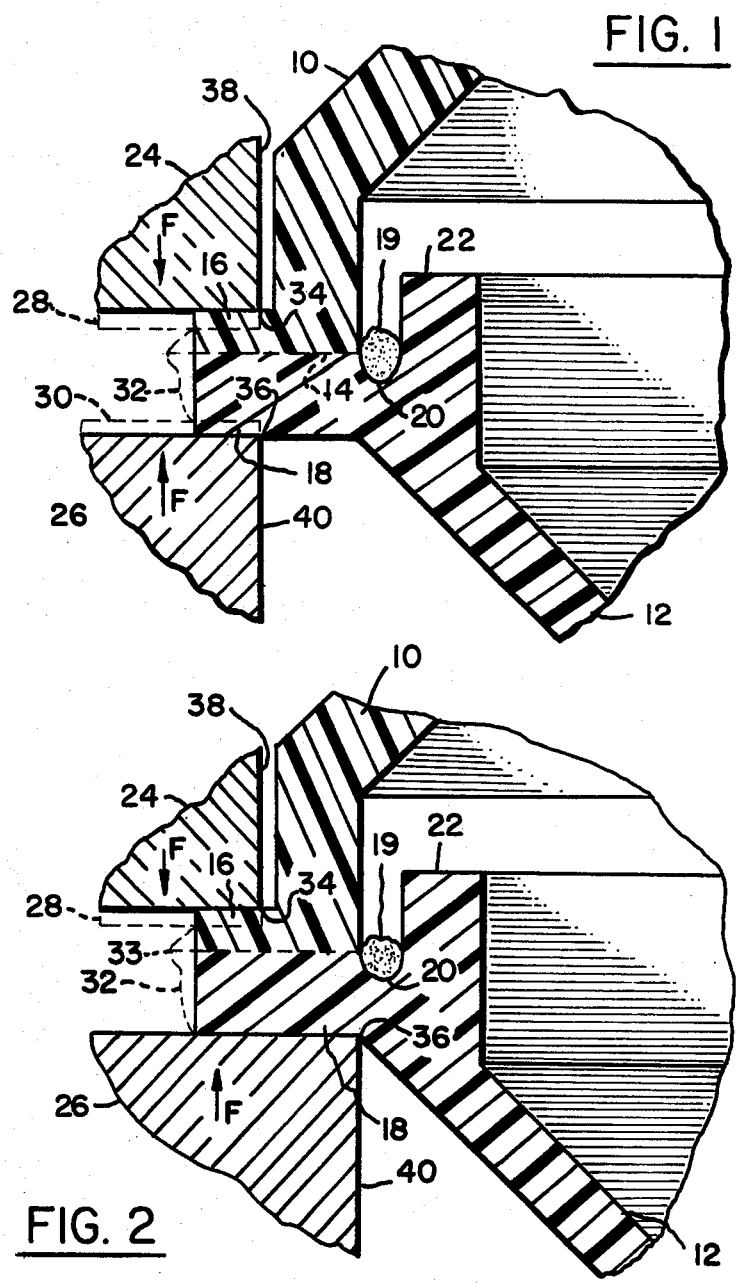

STRESS RELIEF AND EDGE SEALING OF WELDED JOINTS IN PLASTICS PARTS

The present invention relates to plastic welding, and particularly to methods and apparatus for relieving stresses in exposed portions of plastic welds thereby protecting such welds against solvent-induced cracking or crazing, and to plastic parts having welded joints made with such methods.

The invention is especially suitable for use in the manufacture of plastic automotive parts, such as bumpers and lamp housings which are welded by vibration welding, hot-plate welding, or other thermal processes. The invention is also useful in relieving stresses in other plastic parts where such stresses may cause problems. The invention is adapted for use in the plastic welding of various plastic materials, such as polycarbonates, polycarbonate/polyester blends (such as Xenoy, a trademark of General Electric Company) polyvinylchloride (PVC), nylon, and other thermoplastics.

Welded plastic joints, whether produced by friction welding (e.g., vibratory welding), hot-plate welding or other current state-of-the-art thermal welding processes, normally contain residual tensile stresses, both in the weld zone and in the flash extruded from the joint. Residual stresses are believed to arise from differential expansion/contraction of material which occurs during the localized heating, melting, and cooling of material at the joint.

Under conditions of use with exposure to many solvents (such as gasoline and ethylene glycol found in automotive applications), the tensile-stressed areas are highly susceptible to solvent-induced crazing and cracking. Under applied mechanical loading, the solvent-induced cracks act as stress raisers, and may seriously weaken the joint. Where a hermetically sealed joint is required, the solvent-induced cracks may cause functional leakage problems, even in the absence of mechanical loading.

In order to reduce susceptibility to solvent-induced crazing and cracking by current methods, welded joints are often stress relieved by radiant and/or convection heating. The welds may also be sealed to prevent exposure to solvents, by the application of urethane, vinyl, or hot-melt sealants to the edge of the weld. Such current methods are generally time-consuming, expensive, and subject to defects in quality and effectiveness.

It has been suggested that tensile stresses in plastic welds can be relieved by applying compressive forces to the weld (See U.S. Pat. Nos. 4,337,024 and 4,390,384). Nevertheless, methods and means whereby the joints can be compressed conveniently and with assurance that the stresses are adequately relieved and the joints sealed against solvent-induced cracking and crazing have been difficult to accomplish.

Accordingly, it is the principal object of the present invention to provide improved methods and apparatus for plastic welding whereby exposed portions of plastic welds may be treated to obviate effects which give rise to solvent-induced cracking or crazing or otherwise seriously weaken the joint.

It is another object of the present invention to provide plastic parts having improved welded joints with exposed portions in which stresses are at least partially relieved such that the welds are sealed against solvent-induced crazing or cracking.

It is a still further object of the present invention to provide improved methods and apparatus by which plastic welds can be stress relieved conveniently and at low cost.

Briefly described, in the welding of plastic parts to form a joint in accordance with the invention, a flange which extends outwardly from the parts, and which may include a portion of the joint, is compressed by applying compressive forces only to the flange in a direction transverse to the plane of the joint. These forces are of a level beyond the yield point of the flange and serve to relieve stresses in the exposed portion of the joint which includes the flange. Compression may be carried out while shearing the flange at least through the weld zone. Shearing may be carried out with a blade which provides both compressive forces transverse to the plane of the joint and compressive forces along the plane of the joint. The sheared portion of the flange may be removed to provide an exposed joint in which weld-edge stresses are relieved and which is sealed against solvent-induced crazing and cracking or other effects which could seriously weaken the joint.

The foregoing and other objects, features, and advantages of the invention as well as presently preferred embodiments thereof, and the best modes now known for practicing the invention, will become more apparent from a reading of the following description in connection with the accompanying drawings in which:

FIG. 1 is a fragmentary, sectional view of a plastic part having a welded joint in accordance with the invention and illustrating apparatus, in accordance with an embodiment of the invention, for relieving stresses in the joint so that its exposed portions are edge sealed;

FIG. 2 is a fragmentary sectional view, similar to FIG. 1, of the same joint as shown in FIG. 1, wherein the apparatus for relieving the tensile stresses therein is modified;

Figure 3:
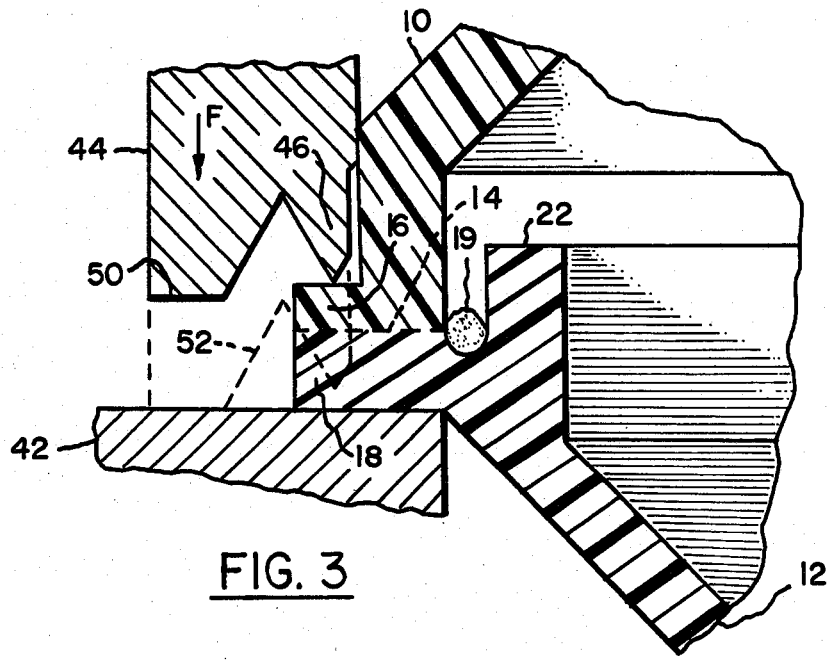
FIG. 3 is a fragmentary sectional view of a plastic weld, in a part similar to that shown in FIGS. 1 and 2, which is stress relieved by compression and shearing, and apparatus for providing such stress relief in the exposed portions of the weld, in accordance with another embodiment of the invention.

Referring first to FIG. 1, there is shown portions of the lens section 10 and the lower body or reflector 12 of a lamp housing, for example, for an automotive headlight or tail light assembly, which are welded together at a weld joint, illustrated by the line 14. The lens 10 and body 12 are formed with flanges 16 and 18 which extend outwardly from the parts. These flanges 16 and 18 overlap each other and provide the necessary surfaces for compression and shearing. When the lens 10 and body 12 are welded, as by vibration or hot plate welding, the adjoining surfaces heat and fuse to provide the weld zone which is in a horizontal plane, the plane including the line 14. In the course of welding, flash 19 which is extruded inside the housing is captured in a groove 20 against a barrier 22.

Either in the welding machine, after the weld has cooled, or in a separate apparatus, the flanges 16 and 18 are placed between upper and lower members 24 and 26. These members may be machined plates, one or both of which move, in a direction transverse, and particularly perpendicular, to the plane of the weld joint 14 under compressive forces indicated by the arrows labeled with the letters "F". These plates pinch the flanges; compressing them beyond their yield point. As the plates move toward each other, a distance shown, for example, by the dashed lines 28 and 30, plastic flow of compressed material occurs both inwardly, toward the inside of the housing, and outwardly. The outward material flow resulting from the compression of the lips is shown by the dashed line 32.

The edges 34 and 36 of the plates are preferably sharp edges which shear material at the surface of the flanges during pinching and minimize the creation of new surface stresses. The upper plate 24 has its inner edge 38 spaced from the outer wall of the lens 10 also to minimize creation of surface stresses at the inside corner of the flange. The final treated joint will approximate the shape defined by the lines 28, 30 and 32 with some allowance for spring-back when removed from the apparatus. The major portion or body of the weld is, as a result of the compression and shearing of the flange area, at least partially stress-relieved and thereby edge sealed against solvent-induced cracking or crazing or other effects which might weaken the joint.

Referring to FIG. 2, the apparatus shown is similar to that in FIG. 1 and like parts are identified by like reference numerals. The lower plate 40 is extended so as to underlie the entire lower surface of the flange 18. This support geometry, while requiring substantially higher compressive forces, may be more readily incorporated into the welding machine (where the lower plate supports the flange during welding). Because little surface compression occurs at the bottom flange, the corner of plate 40 does not need to be sharpened.

Figure 5:
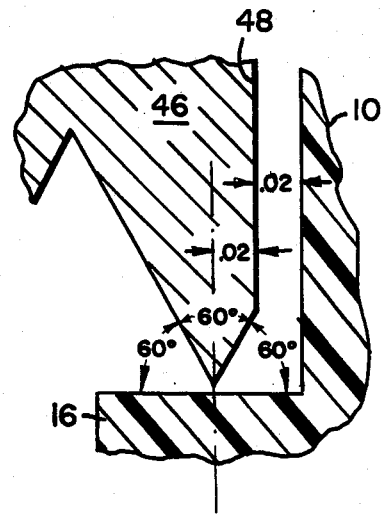
FIG. 5 is an enlarged, fragmentary sectional view showing a shearing blade and its relationship to the flange at the inception of shearing of the flange.

Referring to FIG. 3, there is also shown the same lamp housing with its lens 10 and reflector body 12, as shown in FIG. 1. The parts are welded and the joint is indicated by the line 14. The apparatus for relieving stresses includes a base plate 42, which is preferably fixed, and a moveable compressing plate 44 having a blade 46 along its inner edge. This blade, 46, as shown in greater detail in FIG. 5, has an apex and sides which define an acute angle, typically 60°. In a typical application, the lip extends approximately 1/10th of an inch, and the inside surface of the blade 46 may be spaced by a clearance of approximately 2/100ths of an inch from the lens. The apex of the blade is spaced from the blade edge 48 by another 2/100ths of an inch, in this example. The cutter portion of the plate 44 has a lower surface 50 disposed below the apex of the blade 46.

In operation, the plate 44 is forced downward until its lower surface 50 abuts and is stopped by the upper surface of the base plate 42. As it moves downward, the blade 46 shears the upper flange 16 and part of the lower flange 18; descending to the position shown by the dashed line 52 in FIG. 3. Because of the shape of the blade, not only is the weld zone of the joint sheared and compressed, in a direction transverse and particularly perpendicular to the weld zone, the zone is also compressed in a direction inwardly along the plane of the weld (the adjoining surfaces of the sections 10 and 12 and their flanges 16 and 18, which is represented by the dashed line 14). This compression seals the exposed portion or edge of the weld in that tensile weld stresses therein are relieved.

Figure 4:
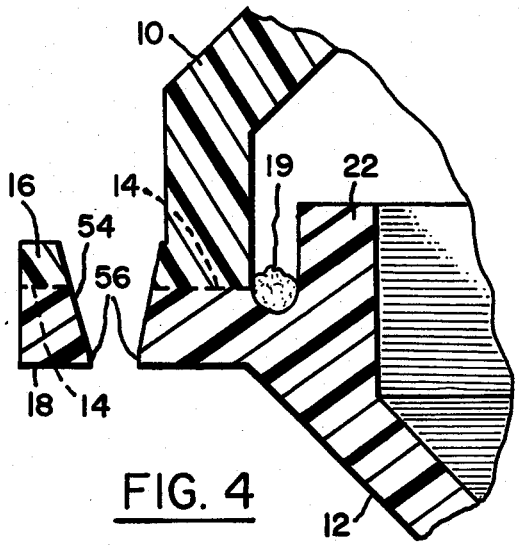
FIG. 4 is a fragmentary sectional view of the parts shown in FIG. 3 which illustrates the parts after welding, and the sheared portion of the flange thereof which is broken away.

As shown in FIG. 4, the lower layers of the flange 18, which are not sheared directly by the blade, may be fractured in tension as upper layers are compressed, and the exterior material provided by the flanges 16 and 18 thereby removed. The exterior trim is shown at 54 in FIG. 4 and the fractured area of the lower flanges 18 is shown at 56.

Figure 6:
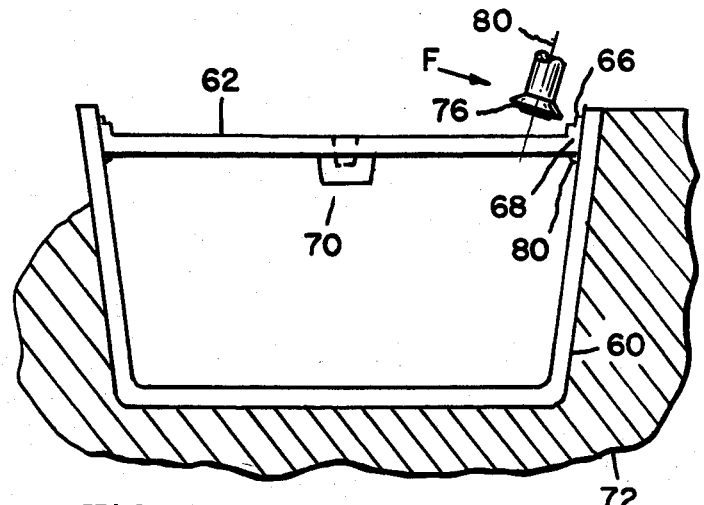
FIG. 6 is a fragmentary sectional view of apparatus for stress relief of the exposed portions of large channel-shaped parts, such as plastic automobile bumpers.
Figure 7:
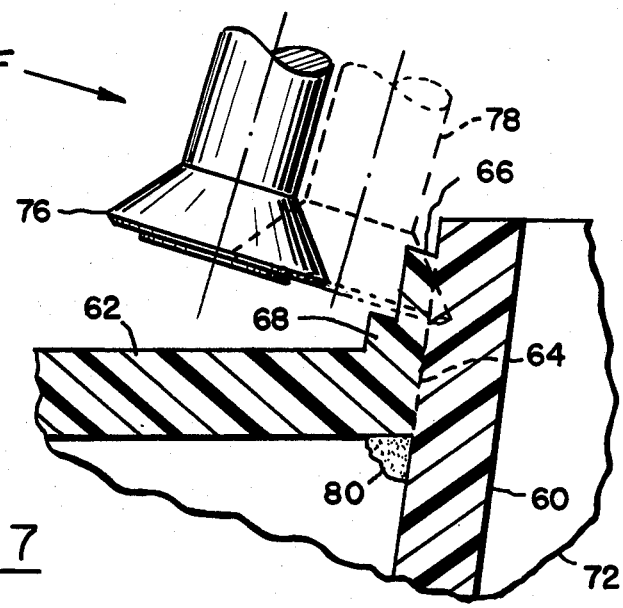
FIG. 7 is an enlarged, fragmentary sectional view illustrating the roller blade shown in FIG. 6 and its operation in compression and shearing the flange to relieve stresses in the exposed portion of the plastic weld.

Referring to FIGS. 6 and 7, there is shown a machine for relieving stresses in the exposed portions of welded joints in channel shaped parts, for example, of an automobile bumper assembly. The bumper assembly consists of a channel 60 and a support plate 62, which is welded along a joint, indicated by the dashed line 64 in FIG. 7. The support plate 62 has a flange or lip 66 in its upwardly extending rim 68. The joint 64 is preferably welded by vibration welding, in which the vibrating welding fixture enters into an indentation 70 in the support plate 68, while the channel 60 is held horizontal in a fixture 72. During welding, clamping forces are applied against upstanding legs 68. The stress-relieving operations may be performed in the same vibration welding machine, with the aid of a roller 74 having a cone-shaped blade 76 which forms an acute angle of cross-sectional shape similar to that of the blade 46 (i.e., a 60° angle between the sides of the blade).

The roller is actuated in response to a force indicated by the letter "F" in FIG. 6 to the position shown by the dashed lines 78 in FIG. 7. The axis 80 of the roller 76 is disposed generally parallel to the sides of the upstanding leg of the channel 60. Then the entire roller and its blade are moved outwardly; shearing the flange 66 and penetrating through the weld zone into the leg of the channel. The roller is then moved longitudinally along the channel, providing a shearing action along the length of the weld. Such shearing is accompanied by compression which relieves the stresses in the weld zone. Of course, another roller and its actuating assembly may be used to stress relieve the other joint on the opposite leg of the channel. Alternatively, the channel may be reversed and the same roller shearing assembly may be used to treat both welds. Since the flash 80 and other areas of the weld joint which are not stress relieved are inside of the stress relieved zone, the body or major portion of the weld joint is thereby protected against solvent-induced cracking or crazing and other effects which might otherwise weaken the weld.

From the foregoing description, it will be apparent that there has been provided improved plastic weld joints and methods and apparatus for stress relief of these plastic joints. Variations and modifications of the herein described joints and methods and apparatus for producing same, within the scope of the invention will become apparent to those skilled in the art. Accordingly, the foregoing description should be taken as illustrative and not in a limiting sense.

We claim:

1. In the method wherein plastic parts having flanges extending outwardly therefrom are welded together to form a joint, the improvement which comprises welding said flanges together to provide a welded joint, and after said welding step and after said joint is solidified, compressing only said flanges in a direction transverse to the plane of said joint and beyond the yield point of said flanges to relieve stresses in said joint.

2. The method according to claim 1 wherein the compressing step is carried out while shearing said flange.

3. The invention as set forth in claim 2 wherein said compressing step is carried out to at least partially shear through the flange and completely through the weld plane of said joint so that the weld zone is compressed and sheared.

4. The invention as set forth in claim 2 wherein said shearing is carried out intermediate to the length of said flange to apply pressure in the direction along the plane of said joint as well as transversely thereto.

5. The invention as set forth in claim 4 wherein said shearing is carried out with a pincer which pinches while shearing said flange.

6. The method of plastic welding which comprises the steps of holding together heated plastic parts in a joint area, defined by lips extending outwardly from said parts, to form a welded joint between the adjoining surfaces of said parts and said lips, after said welded joint is formed and has solidified, compressing said lips beyond the yield strength of the material of said lips, in a direction transverse to the adjoining surfaces of said lips which form said welded joint, to relieve stresses in the region of said joint which contains said lips.

7. The invention according to claim 6 wherein said compressing step is carried out by shearing at least partially through said lips and through said joint.

8. The invention as set forth to claim 7 wherein said compressing step is carried out by pinching said lip from the surfaces of said lip opposite to the adjoining surfaces which form said welded joint.

9. The invention according to claim 8 wherein said pinching step is carried out with a blade which applies forces to said lip in a direction along said joint and in a direction transverse to said joint.

10. The invention according to claim 7 wherein said shearing step is carried out to pierce at least partially through said lip and through said joint, between said parts and the outer end of said lip, and thereby fracturing the remainder of said lip, to remove the outer portion of said lip.

11. Welded plastic parts having a welded joint stress-relieved in accordance with the method comprising the steps of welding said parts by fusing together the adjoining surfaces of said parts and lips projecting outwardly therefrom to provide said joint, and after said welding step and said joint is solidified, pinching said lips together, with forces beyond the yield strength of said lips, to stress relieve said joint.

12. The invention as set forth in claim 11 wherein said pinching step includes shearing said lips at least partially and through said joint.

13. The invention according to claim 12 wherein said shearing step is carried out with pressure applied in the direction along said joint as well as transversely to said joint.

14. The invention according to claim 6 wherein said welded joint is formed by friction welding said parts together.

15. The invention according to claim 14 wherein said friction welding is carried out by vibrating said parts with respect to each other.

* * * * *